United States Patent
Kator et al.

(10) Patent No.: US 8,560,161 B1
(45) Date of Patent: Oct. 15, 2013

(54) SYSTEM AND METHOD FOR MONITORING AND PREDICTING VEHICLE ATTRIBUTES

(75) Inventors: Lynn Michele Kator, Gurnee, IL (US);
David Nemtuda, Algonquin, IL (US);
Edith Hirtenstein, Chicago, IL (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 859 days.

(21) Appl. No.: 12/605,238

(22) Filed: Oct. 23, 2009

Related U.S. Application Data

(60) Provisional application No. 61/108,018, filed on Oct. 23, 2008.

(51) Int. Cl.
*G06F 7/00* (2006.01)

(52) U.S. Cl.
USPC ........................................................ 701/29.6

(58) Field of Classification Search
USPC ...................... 701/29.6, 32.2, 33.4
See application file for complete search history.

(56) References Cited

U.S. PATENT DOCUMENTS

| | | | |
|---|---|---|---|
| 5,120,704 A | 6/1992 | Lechter et al. | |
| 5,201,010 A | 4/1993 | Deaton et al. | |
| 5,216,612 A | 6/1993 | Cornett et al. | |
| 5,630,070 A | 5/1997 | Dietrich et al. | |
| 5,765,143 A | 6/1998 | Sheldon et al. | |
| 6,055,570 A | 4/2000 | Nielsen | |
| 6,182,048 B1 | 1/2001 | Osborn et al. | |
| 6,208,979 B1 | 3/2001 | Sinclair | |
| 6,236,977 B1 | 5/2001 | Verba et al. | |
| 6,622,266 B1 | 9/2003 | Goddard et al. | |
| 6,703,930 B2 | 3/2004 | Skinner | |
| 6,738,748 B2 | 5/2004 | Wetzer | |
| 6,959,281 B1 | 10/2005 | Freeling et al. | |
| 7,028,052 B2 | 4/2006 | Chapman et al. | |
| 7,050,982 B2 | 5/2006 | Sheinson et al. | |
| 7,092,898 B1 | 8/2006 | Mattick et al. | |
| 7,184,974 B2 | 2/2007 | Shishido | |
| 7,275,083 B1 | 9/2007 | Seibel et al. | |
| 7,366,694 B2 | 4/2008 | Lazerson | |
| 7,472,088 B2 | 12/2008 | Taylor et al. | |
| 7,542,993 B2 | 6/2009 | Satterfield et al. | |

(Continued)

FOREIGN PATENT DOCUMENTS

| | | |
|---|---|---|
| EP | 1 122 664 | 8/2001 |
| JP | 09-251486 | 9/1997 |

(Continued)

OTHER PUBLICATIONS

Hirtenstein, et al., U.S. Appl. No. 11/893,609, filed Aug. 16, 2007 (published as U.S. 2008/0046383 A1 on Feb. 21, 2008), please see all past and future Office Actions, Responses, Amemdments and Claims.

(Continued)

*Primary Examiner* — Kim T Nguyen
(74) *Attorney, Agent, or Firm* — Knobbe Martens Olson & Bear LLP

(57) ABSTRACT

One embodiment of the system and method described herein provides a vehicle monitoring system that gathers reported data on a selected vehicle and alerts a user to selected events reported for that vehicle. In an embodiment, vehicle attributes are processed into a score for the vehicle, such as representing the likely life remaining, and changes in a score trigger alerts to the user.

7 Claims, 4 Drawing Sheets

(56) References Cited

U.S. PATENT DOCUMENTS

| | | | |
|---|---|---|---|
| 7,571,139 | B1 | 8/2009 | Giordano et al. |
| 7,580,856 | B1 | 8/2009 | Pliha |
| 7,590,589 | B2 | 9/2009 | Hoffberg |
| 7,596,512 | B1 | 9/2009 | Raines et al. |
| 7,610,257 | B1 | 10/2009 | Abrahams |
| 7,653,592 | B1 | 1/2010 | Flaxman et al. |
| 7,962,404 | B1 | 6/2011 | Metzger, II et al. |
| 8,005,759 | B2 | 8/2011 | Hirtenstein et al. |
| 8,219,464 | B2 | 7/2012 | Inghelbrecht et al. |
| 8,392,334 | B2 | 3/2013 | Hirtenstein et al. |
| 2002/0023051 | A1 | 2/2002 | Kunzle et al. |
| 2002/0072964 | A1 | 6/2002 | Choi |
| 2002/0099628 | A1 | 7/2002 | Takaoka et al. |
| 2002/0128960 | A1 | 9/2002 | Lambiotte et al. |
| 2002/0169747 | A1 | 11/2002 | Chapman et al. |
| 2003/0033242 | A1 | 2/2003 | Lynch et al. |
| 2003/0105728 | A1 | 6/2003 | Yano et al. |
| 2003/0115122 | A1 | 6/2003 | Slater et al. |
| 2003/0200151 | A1 | 10/2003 | Ellenson et al. |
| 2003/0216965 | A1 | 11/2003 | Libman |
| 2003/0233323 | A1 | 12/2003 | Bilski et al. |
| 2004/0107125 | A1 | 6/2004 | Guheen et al. |
| 2004/0163101 | A1 | 8/2004 | Swix |
| 2005/0251820 | A1 | 11/2005 | Stefanik et al. |
| 2005/0256780 | A1 | 11/2005 | Eldred |
| 2005/0267774 | A1 | 12/2005 | Merritt et al. |
| 2006/0004731 | A1 | 1/2006 | Seibel et al. |
| 2006/0041443 | A1 | 2/2006 | Horvath |
| 2006/0242039 | A1 | 10/2006 | Haggerty et al. |
| 2006/0242046 | A1 | 10/2006 | Haggerty et al. |
| 2006/0242050 | A1 | 10/2006 | Haggerty et al. |
| 2007/0067437 | A1 | 3/2007 | Sindambiwe |
| 2007/0156515 | A1 | 7/2007 | Hasselback et al. |
| 2007/0179798 | A1* | 8/2007 | Inbarajan .................. 705/1 |
| 2007/0179860 | A1 | 8/2007 | Romero |
| 2007/0192165 | A1 | 8/2007 | Haggerty et al. |
| 2007/0226130 | A1 | 9/2007 | Haggerty et al. |
| 2007/0244732 | A1 | 10/2007 | Chatterji et al. |
| 2007/0250327 | A1 | 10/2007 | Hedy |
| 2007/0288271 | A1 | 12/2007 | Klinkhammer |
| 2008/0046383 | A1 | 2/2008 | Hirtenstein et al. |
| 2008/0059317 | A1 | 3/2008 | Chandran et al. |
| 2008/0228635 | A1 | 9/2008 | Megdal et al. |
| 2008/0255897 | A1 | 10/2008 | Megdal et al. |
| 2008/0294540 | A1 | 11/2008 | Celka et al. |
| 2008/0312969 | A1* | 12/2008 | Raines et al. .................. 705/4 |
| 2009/0018996 | A1 | 1/2009 | Hunt et al. |
| 2010/0198629 | A1 | 8/2010 | Wesileder et al. |
| 2010/0332292 | A1 | 12/2010 | Anderson |
| 2011/0213641 | A1 | 9/2011 | Metzger, II et al. |
| 2012/0095927 | A1 | 4/2012 | Hirtenstein et al. |

FOREIGN PATENT DOCUMENTS

| | | |
|---|---|---|
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 2002-0068866 | 8/2002 |
| WO | WO 99/04350 | 1/1999 |
| WO | WO 01/71458 | 9/2001 |
| WO | WO 01/75754 | 10/2001 |
| WO | WO 03/101123 | 12/2003 |
| WO | WO 2007/149941 | 12/2007 |
| WO | WO 2008/022289 | 2/2008 |

OTHER PUBLICATIONS

"Consumer Reports Finds American-Made Vehicles Close Reliability Gap with European-Made Vehicle-As Japanese Continue to Set New Benchmarks for the Industry", Consumer Reports: Consumers Union, Yonkers, NY, Apr. 2003.

"Japan's JAAI system appraises used cars over internet", Asia Pulse, Mar. 3, 2000.

"WashingtonPost.com and Cars.com launch comprehensive automotive web site for the Washington area", PR Newswire, Oct. 22, 1998.

Cohen et al., "Optimizer: IBM's Multi Echelon Inventory System for Managing Service Logistics", Interfaces, vol. 20, pp. 65-82, Jan.-Feb. 1990.

Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.

Handfield, Robert B. et al., "Managing Component Life Cycles in Dynamic Technological Environments", International Journal of Purchasing and Materials Management, Tempe, vol. 30, Iss. 2, p. 20, 9 pgs., Spring 1994, ProQuest ID 590096.

Inderfurth et al., "Decision Support for Spare Parts Acquisition in Post Product Life Cycle", Central European Journal of Operations Research, vol. 16, pp. 17-42, 2008 [Initially published online Dec. 21, 2007].

Käki, Anssi, "Forecasting in End-Of-Life Spare Parts Procurement", Master's Thesis—Helsinki University of Technology System Analysis Laboratory, Jul. 27, 2007.

Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].

Krupp, James A.G.; "Forecasting for the Automotive Aftermarket"; The Journal of Business Forecasting Methods & Systems; Winter 1993-1994; 12, 4; ABI/Inform Global; pp. 8-12.

Lapide, Larry, "New Developments in Business Forecasting", The Journal of Business Forecasting, pp. 12-14, Spring 2002.

Miller, Joe, "NADA used-car prices go online", Automotive News, Jun. 14, 1999, p. 36.

Moore, John R., Jr. "Forecasting and Scheduling for Past-Model Replacement Parts" Management Science, Application Series, vol. 18, No. 4, Part 1 (Dec. 1971), pp. B200-B213.

Packer, A. H., "Simulation and Adaptive Forecasting an Applied to Inventory Control", Operations Research, vol. 15, No. 4, pp. 660-679, Jul. 1965.

Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.

Porter, G. Zell, "An Economic Method for Evaluating Electronic Component Obsolescence Solutions", Retrieved from the web at www.gidep.org/data/dmsms/library/zell.pdf, May 1998, pp. 1-9.

Roos, Gina, "Web-Based Service Helps OEMs Cure Parts Obsolescence Blues", Electronic Engineering Times, p. 86, Oct. 8, 2001, Dialog 09056737 78968668.

Santarini, Michael, "Forecasts the Probably Obsolescence of Components—Module Predicts Parts Life.", Electronic Engineering Times, Jan. 11, 1999, p. 48(1), Dialog 0607160353548246.

Sawyers, Arlene, "NADA to Offer Residual Guide", Automotive News, May 22, 2000, p. 3.

Sullivan, Laurie, "Obsolete-Parts Program Thriving", EBN, Manhasset, Issue 1296, p. 26, Jan. 2002, ProQuest 10 101195090.

Webster, Lee R., "Failure Rates & Life Cycle Costs", Consulting-Specifying Engineer; 23, 4; ABI/Inform Global, Apr. 1998, p. 42.

(56) References Cited

OTHER PUBLICATIONS

"AutoConnect Partners with Organic to Build World's Most Comprehensive Online Emporium of Pre-Owned Vehicles", PR Newswire, May 19, 1998, pp. 2.

"Carfax Teams with Esurance", PR Newswire, May 14, 2001, 1 Page.

"Driveitaway.com Links with AutoCheck to Provide Car Shoppers Vehicle Histories", PR Newswire, Jan. 15, 2001, 1 Page.

Koller, Mike, "Wireless Service Aids," InternetWeek; Jul. 9, 2001, p. 15.

Lee, Ho Geun, "AUCNET: Electronic Intermediary for Used-Car Transactions", EM-Electronic Markets, Dec. 1997, vol. 7, No. 4, pp. 24-28.

"Stoneage Corporation Announces Database of 250,000 Used Cars Posted to the Internet", PR Newswire, Feb. 24, 1998, 1 Page.

"Web Sites Let Automotive Consumers Arm Themselves with Price Information", Orange County Register, Nov. 14, 1997, pp. 3.

"Yahoo! Autos Provides Enhanced Road Map for Researching, Buying and Selling Cars Online", PR Newswire, Oct. 13, 1998, pp. 2.

* cited by examiner

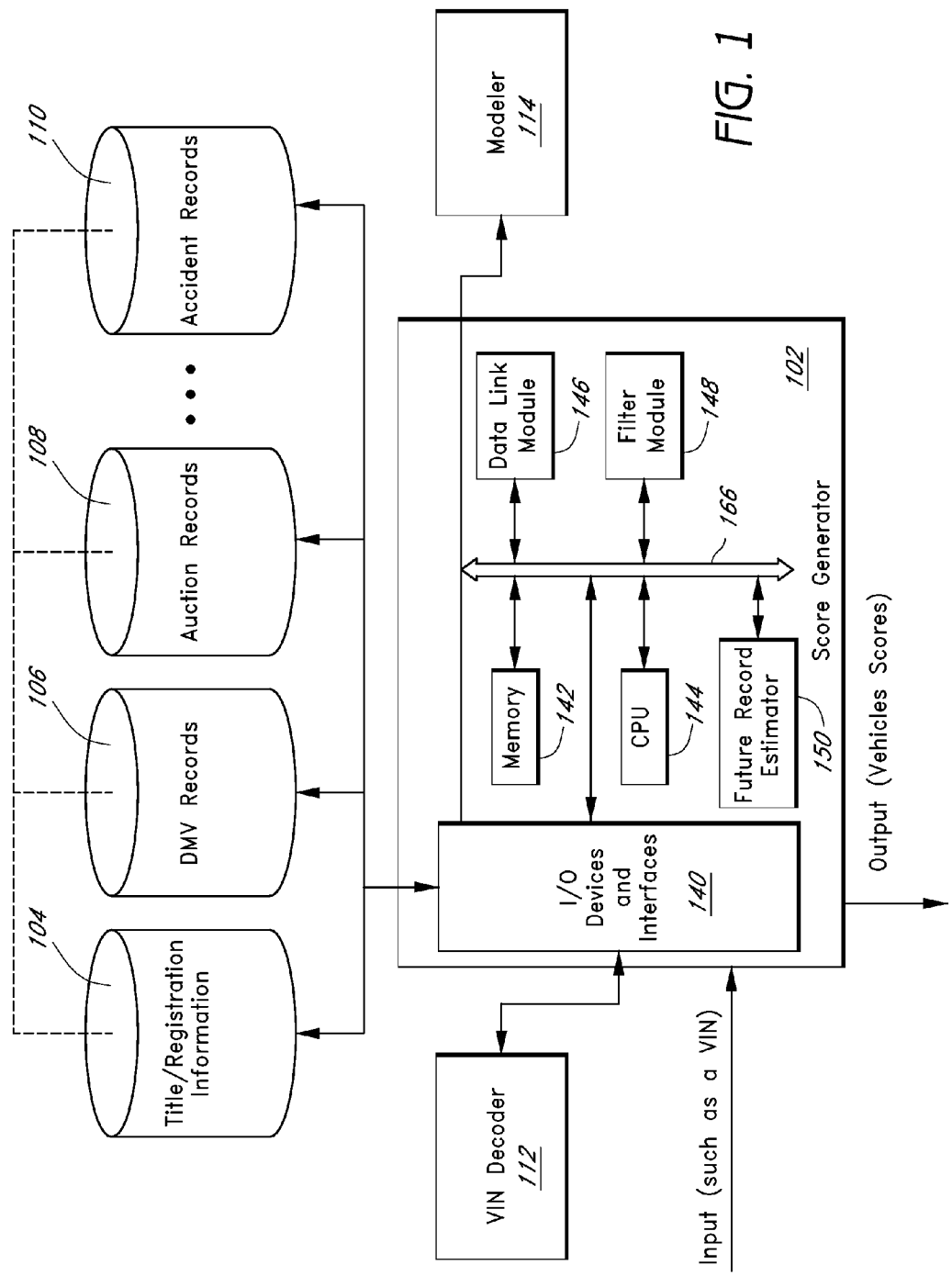

SYSTEM AND METHOD FOR MONITORING AND PREDICTING VEHICLE ATTRIBUTES

RELATED APPLICATIONS

This application claims priority from U.S. Provisional Application No. 61/108,018, filed Oct. 23, 2008, and titled "System and Method for Monitoring and Predicting Vehicle Attributes," which is hereby incorporated by reference in its entirety for all purposes. This application is also related to U.S. application Ser. No. 11/893,609, filed Aug. 16, 2007 and titled "System and Method for Providing a Score for a Used Vehicle;" U.S. Provisional Application No. 60/838,468 filed Aug. 17, 2006; U.S. Provisional Application No. 60/888,021 filed Feb. 2, 2007; and U.S. Provisional Application No. 60/949,808 filed Jul. 13, 2007, each titled "System and Method for Providing a Score for a Used Vehicle." The contents of these four applications are also hereby incorporated by reference in their entirety.

BACKGROUND

1. Field of the Disclosure

This disclosure relates generally to automated vehicle analysis systems for analyzing used vehicles and alerting interested parties to vehicle history events.

2. Description of the Related Art

As discussed in U.S. application Ser. No. 11/893,609 titled "System and Method for Providing a Score for a Used Vehicle," buying a car can be a difficult proposition. That application discloses a scoring system that allows potential purchasers to quickly and easily compare various used cars against other cars of the same make, model, or class or even across these categories. While having updated scoring of various vehicles may help provide information to potential purchasers, a vehicle owner with access to only current scores may still have problems determining how long to expect a car to last, when to sell a car for maximum value, and the like. Additionally, some vehicle owners or other interested parties, such as title-holding lessors (including, for example, banks, financial arms of automobile manufacturers, and leasing companies), dealerships, or automobile manufacturers, may wish to monitor specific events in a vehicle's life at a more precise granularity than just a vehicle score.

SUMMARY

This disclosure provides improvements and additional features for, or alternatives to, systems and methods utilizing a vehicle score. In one embodiment, a system is provided that allows a user to track a vehicle's score throughout the lifetime of the vehicle. The system can provide a graphical view of the history of the vehicle and changes in a vehicle score. Additionally, the system, in an embodiment, may alert a user of a change in the vehicle score.

An embodiment of a system as disclosed herein may provide alerts to a user for specific events or sets of events in a vehicle's life. Various aspects of a vehicle's history that affect the score as disclosed in the related application may be of particular interest to a user. For example, a car owner may wish to be alerted if the car is ever registered in a different state—this may be an indication of vehicle cloning if not authorized by the owner. Additionally, a leasing company may wish to be alerted when any of the cars it has leased are the subject of title branding events, such as a flood damaged vehicle or the like. Similarly, other major or minor negative events could trigger an alert. In an embodiment of the system, the significance of an event required to trigger an alert may be set by the interested party. Various embodiments of the system disclosed herein can be configured to identify such circumstances and to send emails, SMS messages, and the like to users for any of a number of such events.

In addition to the historical information, an embodiment can also provide estimates of future changes in scoring values. Another aspect of an embodiment is a tool to use the vehicle score and predictions to compare vehicle valuations and loan values, providing a user with a way to better understand the timing to optimize the sale or trade-in of a vehicle.

For example, a vehicle score for a five year old vehicle can be calculated one time for each year of the vehicle's life, so that multiple scores over the life of a vehicle show a steady or rapid decline based on the reported vehicle's history, more mileage put on the vehicle, additional usage, vehicle events, and the like. Additionally, this same vehicle's score can also be projected into the future, showing, for example, how a vehicle's score may further decline over five years. In an embodiment, this may be based on the vehicle's current mileage, recent usage factors and the like. Certain repairs or modifications also may allow a vehicle's score to increase.

Moreover, another aspect of an embodiment is a system that provides a user-accessible tool to compare a vehicle score, vehicle valuations, and loan values. For example, a vehicle owner may review a report of their vehicle's current score and estimated decline in that score over time. The tool may calculate predicted vehicle valuations as a trade-in or at retail with respect to the estimated scores. The owner can then determine when the best time to trade-in the vehicle might be, such as before a period of use that is likely to result in a precipitous drop in the vehicle's value. Specifically, for example, a car may start at a high or perfect score and the predictor may indicate that it will sharply decline for the first few months off the line. Next the decline may taper off for four years, followed by another sharp decline. While this may not signal the end of the life of the car, an owner may choose to sell the car or trade it in before the fourth year.

For purposes of summarizing this disclosure, certain aspects, advantages and novel features of the disclosure have been described herein. Of course, it is to be understood that not necessarily all such aspects, advantages or features will be embodied in any particular embodiment of the disclosure.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit its scope. Throughout the drawings, reference numbers are reused to indicate correspondence between referenced elements.

FIG. 1 illustrates a block diagram of an embodiment of a system for generating a vehicle score and predicting future scores.

DETAILED DESCRIPTION

Figure 1B:
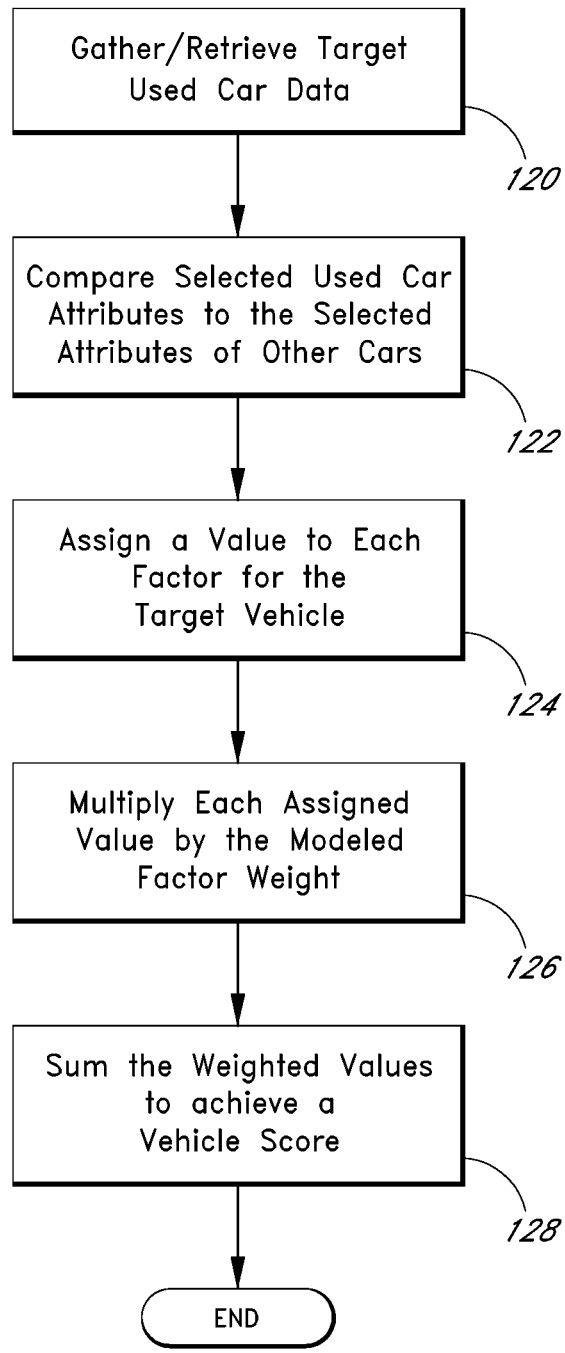
FIG. 1B illustrates a block diagram detailing an embodiment of a score generator in a system for generating a vehicle score and predicting future scores.

In one embodiment, an automated vehicle analysis system receives data from one or more databases that store vehicle information, and applies a multi-layer set of filters to the data to generate a vehicle score for a used automobile. The vehicle score is preferably simple in its presentation. In an embodiment, the multi-layered filters filter data using various factors such as, for example, vehicle age, mileage, location of use, number of owners, and number and type of accidents reported to determine a numerical value representative of the overall characteristics of a vehicle. In one embodiment, this score may represent the likelihood that a car will still be on the road in five years, for example. In one embodiment, a single vehicle may receive two sets of numerical scores—one set defining its position with respect to all makes and models, and the second set defining its position with respect to vehicles of the same make/model/year.

In an embodiment, a score monitor module works with a score generation module to provide tracking and trending data and predictions. The score monitor module may also include an alert generator to alert vehicle owners if a car drops below a certain score, drops significantly in a short period of time, is likely to drop at some future time (such as in the next month), or the like.

Additionally, in an embodiment, a score generator module may be configured to pass notification of specific events in a vehicle's records to the score monitor module. The score monitor module can then match these against a list of user-alerts and send alerts to users notifying them of the specific events that they wish to monitor. The score monitor module may alternatively be configured to receive data from any of one or more databases that store vehicle information. The databases may or may not be the same as those in communication with the score generator.

Various embodiments and examples of the systems and methods for monitoring a vehicle will now be described with reference to the drawings. Like numbers indicate corresponding parts among the drawings and the leading digit represents the figure in which such part was first shown.

While some of this disclosure refers to the systems with respect to automobiles, it is understood that the same or similar systems could be configured to provide similar information for any type of vehicle, including motorcycles, sailboats, power boats, ships, airplanes, jets, recreational vehicles, ATVs, and the like.

System

Turning to FIG. 1, in an embodiment, a system for generating vehicle scores includes a score generator 102 and any of a number of vehicle information databases or data sources. These databases may include, for example and without limitation, Title and/or Registration Information database 104, Department of Motor Vehicle Records 106, Auction Records 108, Accident Records 110, and/or any other database or data source that includes a collection of records relating to vehicles. Vehicle information may also be obtained or derived from dealer records, state agency records, independent agency records, and the like. Vehicle information may be gathered from one or more of these databases or data sources into a primary vehicle database or stored in separate databases for use by the score generator 102 as needed. A system may also include a modeler 114 that helps determine the weighting of various factors to be used in a score. In an embodiment, the modeler 114 may include an actual or simulated neural network to help determine factor weightings. In an embodiment, modeler 114 may be a background process or module that may be run periodically regardless of specific score requests. Potential modeling processes are described in more detail below and in U.S. application Ser. No. 11/893,609.

Score generator 102 may, in an embodiment, include one or more input/output (I/O) devices and interfaces 140 for communications with, for example, the databases 104, 106, 108, 110, a Vehicle Identification Number (VIN) decoder 112, and a modeler 114. In an embodiment, an I/O device and interface 140 may be a network device and a network interface module to facilitate communication between it and the databases 104-110, the VIN decoder 112 and the modeler 114. Input for and output from the score generator 102 may also be communicated through the I/O devices 140. Typically a score generator will also include one or more memory units 142 and one or more central processing units (CPUs) 144. A preferred embodiment of the score generator 102 will also include a data link module 146 and a filter module 148. The data link module 146 advantageously provides linking of associated data from the various databases 104, 106, 108, and 110. Through the data link module 146, the score generator 102 may create a more complete picture of individual automobiles by combining information on a selected vehicle from the various databases 104-110, which may store data in differing formats and/or according to different database keys. In other embodiments, the data received from third parties is parsed by the data link module 146 and stored in a database in a linked format.

There may be a large number of databases storing both useful information and information that is extraneous to the scoring. In an embodiment, the filter module 148 may include a multi-layer filter or filter matrix. One or more filter layers can help reduce the amount of data being processed to that which is useful. For example, a first layer may extract only information relating to the specific vehicle to be scored, while another layer removes data that has little effect on the lifespan and/or value of a specific vehicle—thus having little effect on a vehicle score. For example, in an embodiment, a vehicle's color may be extracted at the first layer, but may be determined to have no effect on the likelihood of a vehicle being on the road in five years, and therefore this factor may be removed by the next layer. The filter module 148 thus helps provide a more efficient processing task for the CPU 144. The filter module 148 may additionally contain filter layers that translate and provide weighting to factors for scoring. For example, the color factor in the example above might be assigned a weight of zero (0) so that it does not impact the results, whereas mileage, which may have significant effect on the overall score, might be assigned a relatively high weighting, such as eight-tenths (0.8). In an embodiment, I/O devices 140, memory 142, CPU 144, the data link module 146, and the filter module 148 may be connected through a bus, network, or other connection. In an embodiment, the modeler 114 comprises a filter generator for filter module 148.

Figure 2:
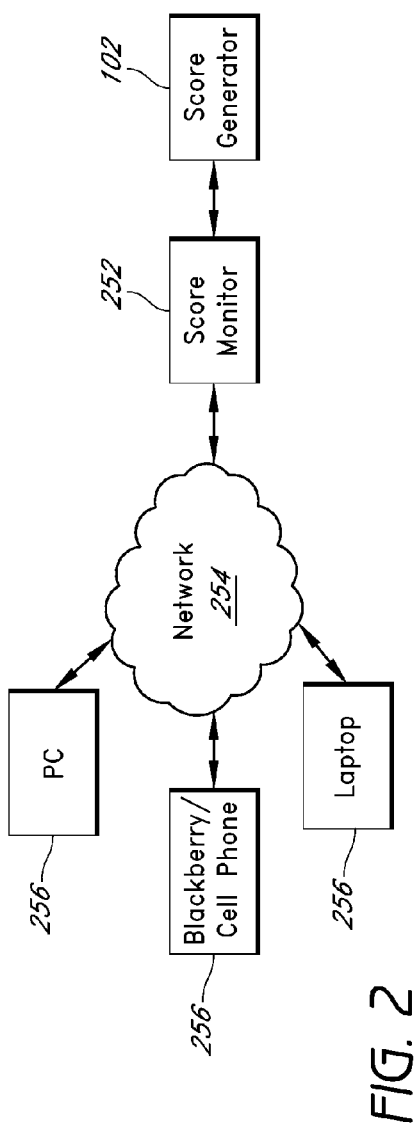
FIG. 2 illustrates an overall system diagram of an embodiment of a system for monitoring scores and predicting vehicle valuations.

Additionally, the input/output (I/O) devices and interfaces 140 may communicate certain data events from any of the various databases 104-110 to a score monitor 252 (see FIG. 2). In various embodiments, this may be done with or without the aid of one or more filters from the filter module 148. This can help identify specific vehicle events that may be the subject of alerts.

Further, in an embodiment, the score generator 102 may include a future record estimator or module 150. This module is configured to evaluate data from the various databases 104-110, the data link module 146, or the like, in order to estimate changes in various factors relating to the vehicle. For example, the future record estimator 150 can predict how many more miles the vehicle is likely to be driven in the next time period, such as a month, quarter, year, or the like. In some embodiments, this prediction may be based on the geographic location of the vehicle, the history of miles driven, and the average number of miles driven on vehicles of similar year, make, model and/or class. Additionally, the likelihood of an accident, required maintenance being performed, whether damage occurring, or other vehicle life events can be calculated in order to predict future changes in a vehicle's score. In some embodiments, the likelihood of an accident occurring may be calculated based on the presence or absence of accidents in the history of the vehicle, the vehicle's geographic location, and the accident history of vehicles of similar year, make, model and/or class. Similarly, the likelihood of required maintenance being performed, the likelihood of damage occurring and the likelihood of other future events may be calculated based on the vehicle's respective history of such events, the vehicle's geographic location, and the respective history of such events on vehicles of the same year, make, model and/or class as the vehicle for which likelihood of future events is calculated.

In an embodiment, an I/O device 140 of a score generator 102 accepts an input—such as a standard VIN—representing the vehicle to be scored. This information may be stored temporarily in memory 142 or used to retrieve vehicle attribute and history information from the various databases, to retrieve one file or complete database entry in the case of a combined primary vehicle database, or to retrieve information from a combination of a combined primary vehicle database and one or more of the others. A VIN may also be passed to a VIN decoder 112 through an I/O device 140 to retrieve vehicle attribute information such as make, model, year, country of manufacture, engine type, and the like. This is possible because VINs are unique identifiers with such information coded into them according to a standard that is agreed upon by car manufacturers. The VIN decoder can also be configured as a hardware or software module contained within the score generator 102 and may be connected to other modules through the bus 166.

In an embodiment, the score generator 102 may then select attributes that will be factors in the scoring. In an embodiment, the data link module 146 accepts records from the various databases 104-110 and/or outside sources and links together records that correspond to the input VIN. Some records may not have an associated VIN, in which case the data link module 146 can utilize some other common element or set of elements to link the records. For example, many records that do not include a VIN include a license plate number which can be used in conjunction with a record, such as a DMV report, to link the VIN. As license plates may be transferred among cars, the dates of the disparate DMV records may help resolve ambiguities between several license plates associated with a single VIN.

The filter module 148, in an embodiment, can filter the incoming records from the databases to limit extraneous data that is linked by the data link module 146. In an alternative embodiment, the data link module 146 may link all incoming data associated with a VIN, and then pass the linked information to the filter module 148 to filter out extraneous data. Additional filter layers for filter module 148 may convert the target vehicle's attributes into numerical value factors for those attributes that affect a vehicle's score. This conversion for each numerical factor may be based in whole or in part on a comparison with an average factor value for the vehicles in the comparison pool (such as all vehicles, a specific vehicle class, or a specific make/model/year). Yet another filter layer may then multiply each of these factor values by a weight for the given factor; the results are summed to create a representative score. The weighting filter layer gives each factored attribute a larger or smaller impact on the final score based on factors that are more or less important.

The future record estimation module 150 can be used in an embodiment to alter the values of one or more of the factors ultimately combined to yield the vehicle score. For example, mileage may be estimated for some upcoming period of time. Additionally, a location factor may help estimate the driving and/or weather conditions that are likely to affect a vehicle. The vehicle's accident history may also be used to predict the likelihood of an additional future accident or accidents and the severity thereof. In an embodiment, the future estimation module may include user input to alter vehicle attributes and show the user how a given set of factors would affect the vehicle score. User input may be accepted by I/O devices 140 and passed to the future estimation module 150. For example, in various embodiments, a user may be able to receive feedback for how the score would be affected if an additional 20,000 miles are driven, an accident occurs, and/or a particular repair is made.

This can help show a vehicle owner when his or her car should best be replaced, the length of time it is likely to last, or other useful information. In another embodiment, such score predicting considers different possible usage and event scenarios (e.g., conservative, moderate, and heavy usage) to predict a range of future scoring. As predictions go farther into the future, the possible score estimations are likely to expand into a general cone shape from the present calculated score. This can help show users best-, worst-, and likely-case scenarios. In some embodiments, a score can be predicted for the likely case scenario of a vehicle for which the likelihood of future events is similar to the history of past events. In addition, a score can be predicted for a worst-case scenario in which for example, the vehicle suffers a severe accident, or the service/maintenance deteriorates from its past levels, and the like. Similarly, a score can be predicted for a best-case scenario in which for example, the vehicle mileage level is lower than past levels, service/maintenance levels are improved from past levels, and the like.

Once a vehicle score is determined it may be output to the requesting user via a display screen, a printer, output audibly, and the like. In an embodiment, the score generator 102 may be connected to or part of a web server that accepts queries from users via the internet, such as by a web browser. Additional examples can be found in the parent application, U.S. application Ser. No. 11/893,609.

System Information

The various features and functions described in this document may be embodied in software modules executed by one or more general purpose computing devices or components, such as the CPU 144. The modules may be stored in any type of computer readable storage medium or device.

Suitable hardware for a vehicle scoring system includes a conventional general purpose single-chip or multi-chip microprocessor such as a Pentium® processor, a Pentium® II processor, a Pentium® Pro processor, an xx86 processor, an 8051 processor, a MIPS® processor, a Power PC® processor, or an ALPHA® processor. In addition, the microprocessor may be any conventional special purpose microprocessor such as a digital signal processor. Furthermore, the score generator 102 may be used in connection with various operating systems such as: Microsoft® Windows® 3.x, Microsoft® Windows 95, Microsoft® Windows 98, Microsoft® Windows NT, Microsoft® Windows XP, Microsoft® Windows CE, Palm Pilot OS, OS/2, Apple® MacOS®, Apple® OS X®, Disk Operating System (DOS), UNIX, Linux®, VxWorks, or IBM® OS/2®, Sun OS, Solaris OS, IRIX OS operating systems, and so forth. In an embodiment, an I/O device and interface 140 may be a network device and a network interface module to facilitate communication between it and user access points. The VIN decoder 112, databases 104-110, and/or the modeler 114 may be implemented on the same or disparate hardware as the score generator 102. For example, in an embodiment, one or more of the modeler 114, databases 104-110, and/or VIN decoder 112 are part of the score generator 102.

User Access

User access may be through a web-enabled user access point such as the user's personal computer or other device capable of connecting to the Internet. Such a device will likely have a browser module that may be implemented as a module that uses text, graphics, audio, video, and other media to present data and to allow interaction with data via the communications network. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices and may also include software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user. The input device(s) may include a keyboard, roller ball, pen and stylus, mouse, trackball, voice recognition system, or pre-designated switches or buttons. The output device(s) may include a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In one embodiment, a user access point comprises a personal computer, a laptop computer, a Blackberry® device, a portable computing device, a server, a computer workstation, a local area network of individual computers, an interactive kiosk, a personal digital assistant, an interactive wireless communications device, a handheld computer, an embedded computing device, or the like.

Example Scoring Process

A process embodiment that score generator 102 may go through in an embodiment of the present disclosure, and some alternatives will be discussed with reference to FIG. 1B. Beginning with a vehicle identifier, such as a VIN, or a set of identifiers, data on the target vehicle is gathered or retrieved in block 120; the data link module 146 may help link the disparate records that are gathered. This may be from a precompiled database or one or more of the sources discussed above. This information preferably at least includes information relating to each factor going into the scoring. If there is missing or unreported information, a negative factor value may be presumed or the factor may be disregarded. Alternatively, an average value may be presumed. If any factors do not necessarily reflect complete data, this can be reported to the user in order to provide the user a gauge of the score's potential error.

In block 122, data gathered on the target vehicle is compared to the other vehicles in the database. Target attributes may be compared to actual vehicle data or a precompiled amalgamation of the vehicles of a given class. For example, the average number of owners, the average mileage, and other average values may be predetermined and stored for easy comparison. This precompilation of data may be preferable to reduce processing resources required for each score request. Preferably, in an embodiment, these hypothetical average cars are created for each class for which scoring is available. For example, in an embodiment, the system may store the attributes of a hypothetical average overall car, as well as hypothetical average make/model combinations.

Based in part on these comparisons, various factors going into the vehicle score are translated into numerical values for the target car in block 124; this may be accomplished through one or more layers of a filter module 148. In some embodiments, these individual factor values may be reported to the user, in numerical or graphical form. Each of the factors listed therein are possible factors in one or more embodiments. For example, the individual factors may represent the relative risk of problems with a vehicle to a potential purchaser. Each factor may also be individually reported as a percentage representation of the vehicle's likelihood of being on the road in five (5) years based on that factor, or otherwise in line with the overall scores.

Returning to FIG. 1B, each of the assigned values for the given factors are multiplied by a factor weight through, in an embodiment, a filter layer of module 148 (block 126). This gives the more important factors, as determined by prior modeling, a greater impact on the overall score than less important factors. For example, in an embodiment, if car color is a factor but is determined to have no effect on the likelihood of a vehicle being on the road in five years, the color factor weight would be zero (0) so that it does not impact the results. In an embodiment, mileage may have significant effect on the overall score and thus get a relatively high value, such as eight-tenths (0.8). Block 128 sums the resulting weighted factor values to achieve a final vehicle score. Again, a filter layer may be employed to sum or otherwise combine the various factors.

It is understood that this is just one method of arriving at a score. The final weighted factor values may be averaged or otherwise combined in other embodiments. In some embodiments, the final weighted factor values may also be used in some of the created filters and not in others. The scale for the score will be well known to be variable by those of skill in the art. One embodiment may produce scores between 0 and 100, another 0 to 10, yet another between 0% and 100%, and so on. Conveying the range of the scale to a user should provide sufficient context for a user to interpret the vehicle scores that are reported. For example, range information may include absolute highest and lowest actual and/or theoretical scores for all vehicles for which an embodiment of the disclosure has information. In an embodiment, a user may be presented a range of some or a majority of the scores of any automobile in the database. One range may include the median 50% of car scores, for example. The definition of similar vehicles may change among various embodiments. For example, age ranges and/or class designations may define the population of "similar vehicles." In another embodiment, for example, similar vehicles may be limited to the same or a set of makes, models, model years, "style/body" designations, and/or the like.

Factors

The factors generally will relate to the physical characteristics of the vehicle and/or the history of the vehicle. Any number of such attributes may be used in certain embodiments, but factors are likely to be one or more of the following: make, model, year, engine type, equipped options, number of owners, mileage, number of accidents, severity of accidents, length of time retained by each owner, location(s)

of primary usage, length of any remaining warranties, maintenance history, type of use (e.g. fleet vehicle, government, rental vehicle, taxi, privately owned, etc.), number of times at auction, emissions test records, major branding events (such as a lemon notification, manufacture buyback, total loss/salvage event, water/flood damage, or negative announcement at auction), odometer branding, odometer rollback modeling, stolen vehicle records, repossession records, and the like. Other factors may include driver education data, whether or not a vehicle was used as crash test vehicles, vehicle safety information, crash test ratings, recall information, and the like. Other embodiments may have additional factors not mentioned here, and factors listed here may not be included in all embodiments.

In an embodiment, some of the factors may be numerical values used in raw form, such as the actual number of owners of a car or the absolute number of accidents in which a car was involved. In an embodiment, some of the factors may be relative numbers, such as a value between one (1) and ten (10), with, for example, ten (10) representing far less mileage than the average vehicle of a given age and one (1) representing far more mileage than an average vehicle of the given age. It should be recognized that some factors may be either actual or relational in various embodiments, such as mileage or the length of time specific owners held the car.

Additionally, some factors may be derived values that are based on non-numeric attributes, amalgamations of various individual attributes, related to different numerical attributes, and the like. For example, a value may be derived based on the relative longevity or brand desire of specific makes (a BMW may get a higher value than a Kia, for example). In an embodiment, individual attributes may be analyzed together to create a single factor value such as for maintenance, which may include both the costs and number of maintenance events. A car's location, based on zip code or other identifier, may be ranked with a high, medium, or low risk value such as for flood prone areas versus high salt areas versus temperate areas, or rural versus urban areas, and the like.

While a number of the possible factors have been enumerated herein, it is understood that not all such factors may be utilized in any given embodiment. It would also be known to one of skill in the art that others not mentioned may be utilized in a similar manner or to approximate some of those factors mentioned herein. The present disclosure is not limited by the specific factors but is defined by the limitations of the claims.

Additionally, one or a subset of factors may be determined to have a more significant effect on a resulting score or affect which other factors should be included for more accurate scoring. In such a case, multiple models may be used for different subsets of the overall vehicle market. For example, it may be determined that the age of the vehicle is a very significant factor in determining its score. Once age is broken out, the number of accidents may be the most significant factor in determining a score of a relatively new car, whereas a much older car may be affected mainly by the brand or quality of production of the older car or the number of owners it has had. It is understood from the disclosure herein then that a score generator 102, in an embodiment, may utilize different "sub-models" to generate scores for different segments of the market or to contribute to the overall model. Such an embodiment, where vehicles in different age categories have different factors and weightings that contribute to each score, is described in more detail below.

Modeling

In order to be able to determine which factors to include and/or which included factors should be weighted most heavily in determining the vehicle scores (such as to create various filter layers for the filter module 146), it may be useful to model the weights of one or more sets of factors to determine the relative correlations of each factor to the ultimate outcome. There are a number of modeling techniques that may be used to determine these weights.

It is generally helpful to gather a study file, in this case a large number of vehicle records, including information on all of the potential factors that are believed might be useful in predicting the scores. In an example of a score representing the likelihood of a vehicle still being on the road in five years, it is necessary to include data from both vehicles that remained on the road during a given time period and vehicles that did not. In order to model the likelihood of cars being on the road after five years, a time cutoff Y must be chosen that is at least five years prior to the last data available. The only information relevant after this time period then, in this example, is a binary value of whether or not the vehicle is still on the road. All the data on the vehicles, prior to the time Y is then potential factor data. Data that may be gathered for this study file includes: the Vehicle In or out of Operation designation; number of owners; odometer reading prior to Y; mileage by owner(s); VIN Detail—make, model, year, engine size, country of manufacture, performance options, number off the line, etc.; brands prior to Y, meaning adverse events registered by a state (such as lemon designations, manufacturer buybacks, salvage yard notices, negative announcements at auction); Geography—MSA (metropolitan statistics area)/state/zip/latitude/longitude/etc. by owner; number of months retained by owner(s); number of accidents reported before Y; number of times at auctions prior to Y; any indication of odometer rollback (this may be a calculated value); MSRP Value at Y, at time of retail, and/or at other specific other times; number of times failed emissions; purchase type by owner (such as whether use would be for fleet/government/lease/individual ownership/etc.).

Initial weights for each factor may be assigned at random or may represent estimations. Changing the weight of the various factors may then result in better or worse models. Such modeling may be done by a number of well-known methods such as through the use of neural networks, logistic regression and the like. The approach may also be hands-on with statisticians or others aiding the modeling process or automated, such as with back propagation in a neural network to improve modeling.

Monitoring

In FIG. 2, a system that incorporates the score generator 102 as described above into a score monitoring system is outlined. In an embodiment, a score monitor module 252 communicates with the score generator 102. The score monitor module 252 enables vehicle owners to actively monitor, through end user systems 256, the value of their vehicles, in order to, for example, determine the optimum point at which to sell their vehicle. The score monitor module 252 also enables the generation of alerts of vehicle history events to users, such as for example accidents, mileages crossing predetermined thresholds, and the like. The score monitor module 252 can communicate with any of a number of end user systems 256 through a network 254, such as the Internet, a LAN, a WAN, and/or a wired or wireless network. End user systems 256 can generally be internet-enabled computers, but could be any network-enabled device, such as a Blackberry®, mobile phone, PDA, telephone, or similar device. In an embodiment, the score monitor 252 may further transfer files to a database, server, or other device (not shown). In an embodiment, the score monitor 252 can accept input from the users and act as an intermediary with the score generator 102. For example, in an embodiment, it can provide enhanced features, such as getting a wide range of score predictions based on various future vehicle usage scenarios. As explained above, the score monitor 252 can also be configured to communicate directly with vehicle record databases 104-110 to monitor vehicle events and generate alerts to users wishing to be notified of new vehicle history events.

Figure 3:
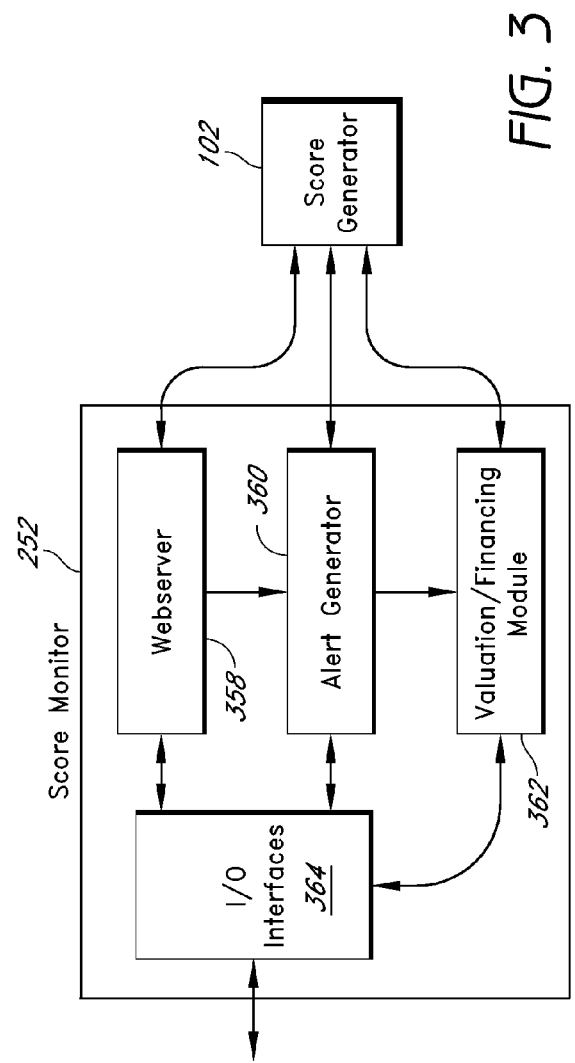
FIG. 3 illustrates a block diagram of an embodiment of a score monitor.

An embodiment of the score monitor 252 is pictured in greater detail in FIG. 3. It includes a web server 358, an alert generator 360, a valuation/financing module 362, and input/output interfaces 364. In an embodiment, the score monitor 252 provides a web server 358 to host or otherwise interact with a website, allowing users to input VINs, receive vehicle scores, receive reports on past and potential future score changes, set up alerts, and the like. An alert generator 360 can be used to periodically check for changes to the score of a specific VIN and generate an alert for the vehicle's owner if specific conditions are met. For example, a user may register with a score monitoring website and input the VIN for their vehicle. This VIN may thereafter be periodically checked for changes in the score. In various embodiments, the VIN may be checked daily, weekly, monthly, biannually, annually, or in any other periodic interval. If a score drops a given amount (for example, 0.3 on a 10.0 scale), an email, SMS text message, or other alert may be generated and sent to the user. In this way, a user would not always be required to check the website in order to monitor changes in the score.

The alert generator 360 can also be configured to obtain vehicle history events through the score generator 102 or directly from a vehicle history data source, such as databases 104-110. In an embodiment, the alert generator 360 can compare new vehicle history events against a set of alert criteria and send out an alert when a vehicle history event matches the alert criteria. The alert criteria may be user requested, automatically generated based on predefined criteria, or set up in any number of ways. One example is a system that allows a user to log onto a website and sign up for alerts, such as if his or her car's title is ever branded—for example, as a flood damaged vehicle.

In another example, a system user may be a financial institution that has leased a number of vehicles. As a lessor having a financial stake in the vehicles' conditions, the financial institution may wish to receive alerts when a specific event occurs for each car to be monitored. For example, the institution may wish to be alerted when the vehicle passes the maximum allowed mileage under the lease. In an embodiment having access to service records or other records that may indicate mileage, the alert generator 360 can report any of the lessor's cars that have mileage reported above a specific number. When multiple vehicles are being monitored, in particular, it may be impractical or unwieldy to have individual email alerts generated. As such, a number of other reporting options can be used. For example, a single daily alert—such as an e-mail, a file transfer, an entry into a shared database, or the like—may be used. For example, a file may be generated specifying each alert triggered for the set of vehicles that the financial institution is monitoring each day (or each day that at least one alert is triggered). Such a file may be available through a file sharing system, uploaded to an FTP site, delivered as an e-mail attachment, or the like. Many other alert conditions and reporting possibilities will be understood by those of skill in the art to be encompassed within the scope of this disclosure. For example, a financial institution may wish to monitor accident reports, title branding events, and the like. In an embodiment, all data for the alerts is gathered from public records and any individual can set up an alert for any vehicle.

One of the advantages to a system with an alert generator 360, as described, is that an interested party can set up an alert for any vehicle, regardless of its age, make, or model. Physical possession or inspection of the car is not required; as such, a lessor, in particular, who may have knowledge of the vehicle's VIN, will have greater information available to evaluate the vehicle's use and the lessee's compliance with lease terms.

Figure 4:
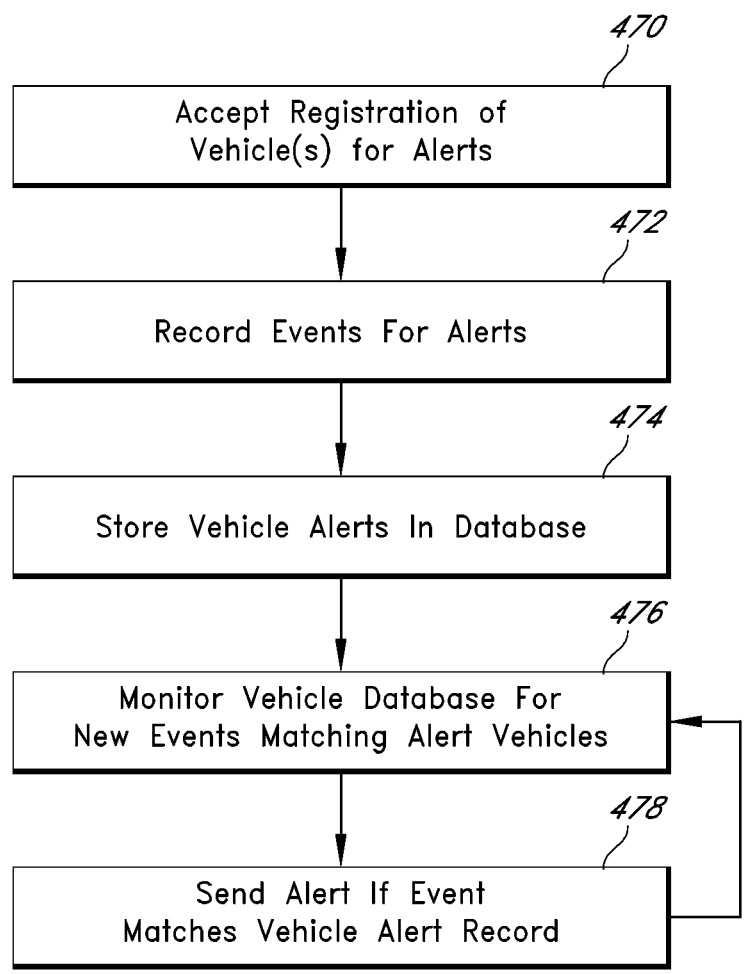
FIG. 4 illustrates a flow diagram of an embodiment of a vehicle alert method.

In a further example, vehicle monitoring and alerts can help financial institutions protect their investment in a given vehicle. For example, using an embodiment, a financial institution may elect to monitor accident reports for the vehicles to which it holds title (based on leases or automobile loans, for example). Some studies of automobile data, conducted by Experian Information Solutions Inc., the assignee of the present disclosure, indicate that vehicles that are repossessed may be significantly more likely to have been in an accident within a year of the repossession than the average vehicle. As such, a vehicle monitoring system can provide multiple levels of alerts. First, the financial institution may elect to monitor all of its vehicles for accidents. As shown in FIG. 4, a monitoring system can accept registration of such vehicles (block 470), such as by accepting a list of VINs to monitor. The financial institution can then select accidents as an event type (block 472). The monitoring system can then store this data in a database (block 474). On a periodic basis, the alert generator 360 can scan a vehicle database, such as any of databases 104, 106, 108, 110, for new events with the registered VINs (block 476). In another embodiment, the alert generator 360 can scan incoming events whenever a database is updated with new events. If a newly reported event indicates that a monitored vehicle was in an accident, an alert can be sent to the financial institution (block 478). This may provide the financial institution with additional warning that the vehicle may ultimately be repossessed and allow the financial institution to set up additional monitoring and/or more specific alerts.

Moreover, if the financial institution ultimately concludes that repossession of a vehicle may be necessary, it may choose to be alerted to any vehicle event. It is often difficult to effect a repossession of a vehicle, because the driver often times does not wish to relinquish possession. Such a driver will often hide the vehicle or take it to another state. As such, the financial institution may not know where to find the vehicle. The alert system disclosed herein can help alleviate that problem by providing location information from events that are reported. For example, when a car must be repossessed by a financial institution, it can set up an alert for any reportable event including for example changes in registration information, changes in maintenance information, and the like. Those events can then be reviewed for location information which can be passed in an alert to the financial institution or the entity that will actually effect the repossession. This is often referred to as skip tracing. For example, new registrations may indicate a city or state for the vehicle. It is understood that such a system could provide more detailed information, such as a name or address, but the implementation of such a system would depend on the applicable privacy laws that would need to be followed. Similarly, in an embodiment, a vehicle service event may indicate the exact location of a vehicle when it was being serviced, such as for example, the name, address, phone number, and/or website of a dealership service center. Depending on the source of the data and the processing time to get it entered into a system as disclosed, the data may be a few minutes, days, or even weeks old. Depending on the timing, an alert with this data at least would allow the repossession entity narrow its search and to contact the dealership to obtain additional information.

Returning to FIG. 3, another aspect of a score monitor 252 can be a valuation or finance module 362. This module can be used to help a user predict how changes in a vehicle score will affect their resale price, trade-in value, loan values, and the like. In an embodiment, if a user wishes to utilize financing features, a user will input information on the financing or loan terms associated with the vehicle being monitored.

For example, the web server 358 may provide a form for a user to complete on his or her system 256 and submit. This information may then be stored in finance module 362 for analysis and future use. In another embodiment, a database associated with the score monitor 252 may be used to store this information. The finance module 362 can then use the information provided to help project data that may aid a user in deciding when to sell, trade-in, or otherwise dispose of a vehicle. For example, the score monitor 252 and score generator 102 can be used to project the likely decline in a vehicle's score, and in turn, the sale or trade-in value of the vehicle. In some embodiments, the predicted score may be used to estimate the trajectory of the vehicle's value over time, thereby facilitating a decision for optimum sale or trade-in value and/or timing. In other embodiments, the estimates of the vehicle's future value may be used in conjunction with the financing terms of the vehicle in order to facilitate a lease buy-out decision. Using the financing information provided by the user, the finance module 362 can compare the different amounts the user will have to pay out under a loan versus the expected value of the car at the end of each period. As an example, the score monitor 252 may calculate that an additional three months of use of the car will cost the user an additional three loan payments, but that the value of the car would drop as much as or more than those three payments. If such an instance were to occur, it may indicate that a user would be better off selling or trading in the car before investing three more months of payments into it. In another instance, the finance module 362 can be used to calculate whether or not it would be a good investment to invoke a lease buyout clause to keep the vehicle after a given lease term.

In various embodiments, the score monitor 252 may provide general calculations of payment terms, investment-to-date for given time periods, vehicle valuations over time and the like for users to make their own choices. In other embodiments, the calculations made by the score monitor 252 may further include recommendations, such as a recommended sell by date, a recommended sell by mileage, a recommendation to buy out a lease or not, and the like.

Although the foregoing has been described in terms of certain preferred embodiments, other embodiments will be apparent to those of ordinary skill in the art from the disclosure herein. For example, a vehicle score may indicate the likelihood of a vehicle being on the road for another X number of months or years, where X can be any number such as 6 months, 3 years, or 5 years. Similarly, scoring may be based on a car holding up for another Y miles, where Y may be, for example, 15,000 miles, 36,000 miles, or 50,000 miles. Vehicle monitoring may include present scores, past scores, future estimated scores, combinations of the same, and the like. Future predictions may indicate one or more of a best case scenario, worst case scenario, likely scenario based on an owner's past record with vehicles, likely scenario based on the particular vehicle's past record, combinations of the same, and the like. Each of these future estimations may also have their own indications of how the vehicle's valuation, loan valuations, and other monetary considerations are affected.

The present systems and methods may also be accessed by any of a number of means, such as through the Internet as already explained, through computer to computer transfer, through interactive television services, stand-alone or networked kiosks, automated telephone services and the like. Score monitoring may be employed for individual vehicles or in batch in various embodiments. Although much of this disclosure discusses individual user access, it is understood that lenders, dealers, auctioneers, title holding companies, and others involved or interested in vehicles, particularly the used vehicle market, may also utilize this system. Moreover, the described embodiments have been presented by way of example only, and are not intended to limit the scope of the disclosure. Indeed, the novel systems and methods described herein may be embodied in a variety of other forms without departing from the spirit thereof. Accordingly, other combinations, omissions, substitutions, and modifications will be apparent to the skilled artisan in view of the disclosure herein. Thus, the present disclosure is not limited by the preferred embodiments, but is defined by reference to the appended claims. The accompanying claims and their equivalents are intended to cover forms or modifications as would fall within the scope and spirit of the disclosure.

What is claimed is:

1. A method of monitoring a vehicle, the method comprising:
   receiving, by a computer processor, a vehicle identifier associated with a vehicle to be monitored;
   gathering, by a computer processor, information related to the vehicle from at least one database;
   generating, by a computer processor, a current score based at least in part on at least a subset of the gathered information;
   predicting, by a computer processor, a set of changes in the subset of the gathered information, wherein the predicted set of changes includes a likely case change, a worst-case change and a best case change; and
   generating, by a computer processor, a range of predicted scores based at least in part on the subset of the gathered information and the predicted set of changes to the subset of the gathered information, wherein the range of predicted scores comprises scores for one or more of the likely case change, the worst-case change or the best-case change.

2. The method of claim 1, further comprising: supplying the current score and the range of predicted scores to a user.

3. The method of claim 2, wherein the user is one of:
   the vehicle owner;
   a lending institution;
   a title holding company; or
   a prospective purchaser.

4. The method of claim 1, further comprising: generating, by a computer processor, a plurality of ranges of predicted scores based on a plurality of predicted sets of changes in the gathered information.

5. The method of claim 4 wherein the plurality of ranges of predicted scores corresponds to predicted sets of changes in the gathered information for a plurality of time periods.

6. The method of claim 1 further comprising:
   receiving, by a computer processor, financial data relating to the vehicle; and
   using the financial data to compare the current score and the range of predicted scores.

7. The method of claim 6 further comprising:
   generating a recommendation, by a computer processor, of a course of action for the vehicle based at least in part on the use of the financial data.

* * * * *